United States Patent
Huang et al.

(10) Patent No.: US 12,210,351 B2
(45) Date of Patent: Jan. 28, 2025

(54) METHOD FOR CONTROLLING ROBOT TO RETURN TO BASE

(71) Applicant: AMICRO SEMICONDUCTOR CO.,LTD., Guangdong (CN)

(72) Inventors: Huibao Huang, Guangdong (CN); Hewen Zhou, Guangdong (CN); Zhuobiao Chen, Guangdong (CN)

(73) Assignee: AMICRO SEMICONDUCTOR CO., LTD., Guangdong (CN)

( * ) Notice: Subject to any disclaimer, the term of this patent is extended or adjusted under 35 U.S.C. 154(b) by 534 days.

(21) Appl. No.: 17/600,126

(22) PCT Filed: Nov. 11, 2019

(86) PCT No.: PCT/CN2019/117246
§ 371 (c)(1),
(2) Date: Sep. 30, 2021

(87) PCT Pub. No.: WO2020/199592
PCT Pub. Date: Oct. 8, 2020

(65) Prior Publication Data
US 2022/0206508 A1    Jun. 30, 2022

(30) Foreign Application Priority Data
Apr. 1, 2019    (CN) .......................... 201910255033.3

(51) Int. Cl.
*G06F 17/00* (2019.01)
*B62D 57/032* (2006.01)
*G05D 1/00* (2006.01)

(52) U.S. Cl.
CPC ......... *G05D 1/0225* (2013.01); *B62D 57/032* (2013.01); *G05D 1/0238* (2013.01); *G05D 1/0242* (2013.01)

(58) Field of Classification Search
CPC .. G05D 1/0225; G05D 1/0238; G05D 1/0242; G05D 1/0234; G05D 1/0212; B62D 57/032; B25J 9/1666
(Continued)

(56) References Cited

U.S. PATENT DOCUMENTS 6,496,755 B2 * 12/2002 Wallach ............... G05D 1/0295
                                                       701/25
7,332,890 B2 *  2/2008 Cohen .................. H02J 7/0045
                                                       320/109
(Continued)

FOREIGN PATENT DOCUMENTS

CN    101648377 A    2/2010
CN    101972129 A    2/2011
(Continued)

OTHER PUBLICATIONS

Trajectory Planning for Nonholonomic Mobile Robot Using Extended Kalman Filter (Year: 2010).*
(Continued)

*Primary Examiner* — Ronnie M Mancho
(74) *Attorney, Agent, or Firm* — Samson G. Yu (57) ABSTRACT

The disclosure relates to a method for controlling a robot to return to a base. The method includes the robot receives a return-to-base control signal; the robot walks along different preset paths according to different receiving conditions of guidance signals; and when detecting an intermediate signal during walking along a preset path, the robot returns to the base directly under piloting of the intermediate signal instead of walking along the preset path. The guidance signals are signals sent by a charging base, for piloting the robot to return to the base, and include the intermediate signal.

10 Claims, 4 Drawing Sheets

(58) Field of Classification Search
USPC .......................................................... 701/23
See application file for complete search history.

(56) References Cited

U.S. PATENT DOCUMENTS

| | | | | |
|---|---|---|---|---|
| 8,606,401 | B2* | 12/2013 | Ozick | A47L 9/2857 |
| | | | | 700/258 |
| 8,634,958 | B1* | 1/2014 | Chiappetta | G05D 1/0016 |
| | | | | 701/472 |
| 9,280,158 | B2* | 3/2016 | Bron | G05D 1/0234 |
| 9,340,116 | B2* | 5/2016 | Noiri | G05D 1/0225 |
| 10,315,306 | B2* | 6/2019 | Abramson | G05D 1/0225 |
| 10,852,735 | B2* | 12/2020 | Tan | G01C 21/20 |
| 2006/0080802 | A1 | 4/2006 | Tani | |
| 2013/0289816 | A1* | 10/2013 | Vroomen | G05D 1/028 |
| | | | | 700/254 |
| 2015/0032320 | A1* | 1/2015 | Bernini | A47L 11/4011 |
| | | | | 701/23 |
| 2022/0187839 | A1* | 6/2022 | Chen | G05D 1/0242 |
| 2022/0206508 | A1* | 6/2022 | Huang | G05D 1/0242 |
| 2022/0374022 | A1* | 11/2022 | Chen | G05D 1/0274 |

FOREIGN PATENT DOCUMENTS

| | | |
|---|---|---|
| CN | 102811604 A | 12/2012 |
| CN | 103349531 A | 10/2013 |
| CN | 104298241 A | 1/2015 |
| CN | 105361817 A | 3/2016 |
| CN | 106826821 A | 6/2017 |
| CN | 106877454 A | 6/2017 |
| CN | 107885206 A | 4/2018 |
| CN | 108087970 A | 5/2018 |
| CN | 108089584 A | 5/2018 |
| CN | 109193823 A | 1/2019 |
| CN | 208489662 U | 2/2019 |
| CN | 109508014 A | 3/2019 |
| CN | 109933071 A | 6/2019 |
| JP | 2015022754 A | 2/2015 |
| JP | 2016045598 A | 4/2016 |
| KR | 20080092595 A | 10/2008 |
| KR | 20160097051 A | 8/2016 |

OTHER PUBLICATIONS

First Office Action of the counterpart KR application No. 10-2021-7035684 issued on Nov. 29, 2023.
Notification of Grant of the counterpart KR application No. 10-2021-7035684 issued on Jun. 25, 2024.

* cited by examiner

METHOD FOR CONTROLLING ROBOT TO RETURN TO BASE

CROSS-REFERENCE TO RELATED APPLICATION

The disclosure takes a patent document No.201910255033.3, filed on Apr. 1, 2019 and entitled "Method for Controlling Robot to Return to Base" as a priority document, which is incorporated herein its entirety by reference.

TECHNICAL FIELD

The disclosure relates to the field of intelligent robots, and particularly to a method for controlling a robot to return to a base.

BACKGROUND

At present, intelligent robots capable of autonomously moving, such as cleaning robots, security robots, and accompanying robots, all have the function of automatically returning to their bases for charging. However, different robots use different ways to return to the bases, and some robots have the problems of low accuracy in returning to the bases, and even failure in returning to the bases effectively.

SUMMARY

A method for controlling a robot to return to a base includes: the robot receives a return-to-base control signal; the robot walks along different preset paths according to different receiving conditions of guidance signals; and the robot directly returns to the base according to a intermediate signal instead of walking along a preset path, when detecting the intermediate signal during walking along the preset paths. The guidance signals are signals sent by a charging base, for piloting the robot to return to the base, and include the intermediate signal.

Optionally, the robot walks along the different preset paths according to the different receiving conditions of the guidance signals specifically includes: the robot walks along a first preset path without receiving the guidance signals; the robot walks along a second preset path when receiving a left signal or a right signal; and the robot walks along a third preset path when receiving a guard rail signal. During walking, the robot walks along a corresponding path according to a type of a latest received signal; and the guidance signal further includes the left signal, the right signal, and the guard rail signal.

Optionally, the robot walks along the first preset path without receiving the guidance signals specifically includes: the guidance signals is not detected by the robot; by taking a path, corresponding to a regular dodecagon that takes a current position as a center point and a first preset distance as a radius, as the first preset path, the robot, walks straight to a corner point of the regular dodecagon; and the robot walks in a clockwise direction or a counterclockwise direction to a next adjacent corner point along at least one side of the regular dodecagon sequentially until reaching an initial corner point.

Optionally, after the robot walks in the clockwise direction or the counterclockwise direction to the next adjacent corner points along at least the one side of the regular dodecagon sequentially until reaching the initial corner point, the method further includes: the robot judges whether the number of times of walking along the first preset path reaches a first preset number of times, in a case that the number of times of walking along the first preset path reaches the first preset number of times, stops walking along the first preset path, in a case that the number of times of walking along the first preset path does not reach the first preset number of times, continues to walk along the first preset path with a current position as a center point of the regular dodecagon.

Optionally, the robot walks in the clockwise direction or the counterclockwise direction to the next adjacent corner point along at least the one side of the regular dodecagon sequentially until reaching the initial corner point specifically includes: the robot walks along at least the one side of the regular dodecagon toward the next adjacent corner point; when detecting an obstacle, the robot judges whether the next adjacent corner point is the initial corner point, in case that the next adjacent corner point is the initial corner point, the robot walks along an edge of the obstacle until reaching a side of the regular dodecagon, and then continues to walk along at least the one side of the regular dodecagon, or until reaches the initial corner point, and in case that the next adjacent corner point is not the initial corner point, instead of walking toward the next adjacent corner point, the robot turns and walks toward a corner point adjacent to the next adjacent corner point.

Optionally, the robot walks along the second preset path when receiving the left signal or the right signal specifically includes: the robot detects the left signal or the right signal; by taking a path, corresponding to a half regular dodecagon that takes a current position as a center corner point and a second preset distance as a radius, as the second preset path, the robot walks straight to a corner point corresponding to a tip of one end of the half regular dodecagon; and the robot walks along at least one side of the half regular dodecagon to a next adjacent corner point sequentially until reaching a corner point corresponding to a tip of the other end of the half regular dodecagon.

Optionally, after the robot walks along at least the one side of the half regular dodecagon to the next adjacent corner point sequentially until reaching the corner point corresponding to the tip of the other end of the half regular dodecagon, the method further includes: the robot judges whether the number of times of walking along the second preset path reaches a second preset number of times, in case that the number of times of walking along the second preset path reaches the second preset number of times, stops walking along the second preset path, in case that the number of times of walking along the second preset path does not reach the second preset number of time, continues to walk along the second preset path with a current position as a center corner point of the half regular dodecagon.

Optionally, the robot walks along at least the one side of the half regular dodecagon to the next adjacent corner point sequentially until reaching the corner point corresponding to the tip of the other end of the half regular dodecagon specifically includes: the robot walks along at least the one side of the half regular dodecagon toward the next adjacent corner point; when detecting an obstacle, the robot judges whether the next adjacent corner point is the corner point corresponding to the tip of the other end of the half regular dodecagon, in case that the next adjacent corner point is the corner point corresponding to the tip of the other end of the half regular dodecagon, walks along an edge of the obstacle until reaching one side of the half regular dodecagon, and then continues to walk along at least the one side of the half regular dodecagon, or until reaches the corner point corresponding to the tip of the other end of the half regular dodecagon, and in case that the next adjacent corner point is not the corner point corresponding to the tip of the other end of the half regular dodecagon, instead of walking toward the next adjacent corner point, the robot turns and walks toward the corner point adjacent to the next adjacent corner point.

Optionally, the robot walks along the third preset path when receiving the guard rail signal specifically includes the robot detects the guard rail signal; the robot takes a current position as a starting point, and moves back along a first straight line for a third preset distance; the robot turns, and walks straight along a second straight line for a fourth preset distance; and the robot turns, and walks straight along a third straight line for a fifth preset distance, to complete walking on the third preset path. An angle between the first straight line and the second straight line is a first angle, and an angle between the first straight line and the third straight line is a second angle.

Optionally, after the robot walks straight along the third straight line for the fifth preset distance, the method further includes: the robot judges whether the number of times of walking along the third preset path reaches a third preset number of times, in case that the number of times of walking along the third preset path reaches the third preset number of times, stops walking along the third preset path, in case that the number of times of walking along the third preset path does not reach the third preset number of times, continues to walk along the third preset path with a current position as a starting point.

Optionally, when the robot walks along the first straight line, in case that an obstacle is detected, the robot will walk along an edge of the obstacle; when walking along the edge of the obstacle and returning to the first straight line, the robot continues to walk along the first straight line until a linear distance along the first straight line reaches the third preset distance, and stops, then turns and starts to walk straight along the second straight line; when the robot walks along the edge of the obstacle for a sixth preset distance and does not return to the first straight line, the robot turns and starts to walk straight along the second straight line; when the robot walks along the second straight line, in case that an obstacle is detected, the robot will walk along an edge of the obstacle; when walking along the edge of the obstacle and returning to the second straight line, the robot continues to walk along the second straight line until a linear distance along the second straight line reaches the fourth preset distance, and stops, then turns and starts to walk straight along the third straight line; when the robot walks along the edge of the obstacle for a seventh preset distance and does not return to the second straight line, the robot turns and starts to walk straight along the third straight line; when the robot walks along the third straight line, in case that an obstacle is detected, the robot will walk along an edge of the obstacle; when walking along the edge of the obstacle and returning to the third straight line, the robot continues to walk along the third straight line until a linear distance along the third straight line reaches the fifth preset distance, and stops, thereby completing walking on the third preset path; when the robot walks along the edge of the obstacle for an eighth preset distance and does not return to the third straight line, the robot stops, thereby completing walking on the third straight line.

DETAILED DESCRIPTION OF THE EMBODIMENTS

The technical solutions in embodiments of the disclosure will be described below in detail with reference to accompanying drawings in the embodiments of the disclosure. It is to be understood that specific embodiments described below are merely intended to explain the disclosure and not limit the disclosure. Specific details are given in the following description to provide thorough understanding of the embodiments. However, those of ordinary skill in the art will appreciate that the embodiments may be implemented without the specific details. For example, a circuit may be shown in a block diagram to avoid obscuring the embodiments in unnecessary details. In other cases, in order not to obscure the embodiments, well-known circuits, structures, and technologies may not be shown in detail.

Figure 1:
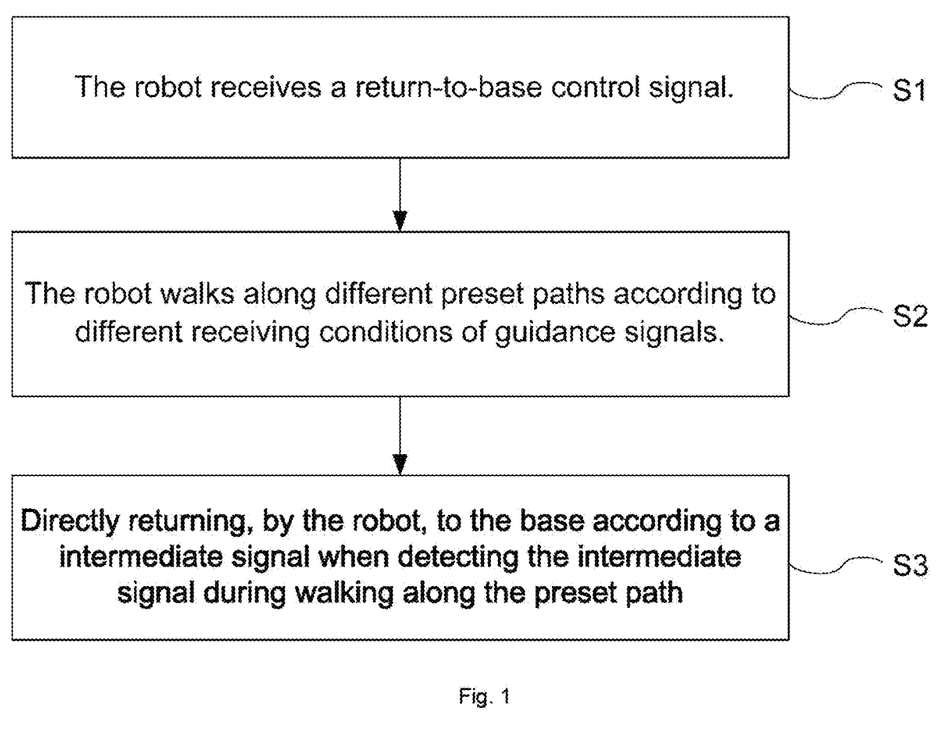
FIG. 1 is a schematic flowchart of a method for controlling a robot to return to a base according to some embodiments of the disclosure.
Figure 2:
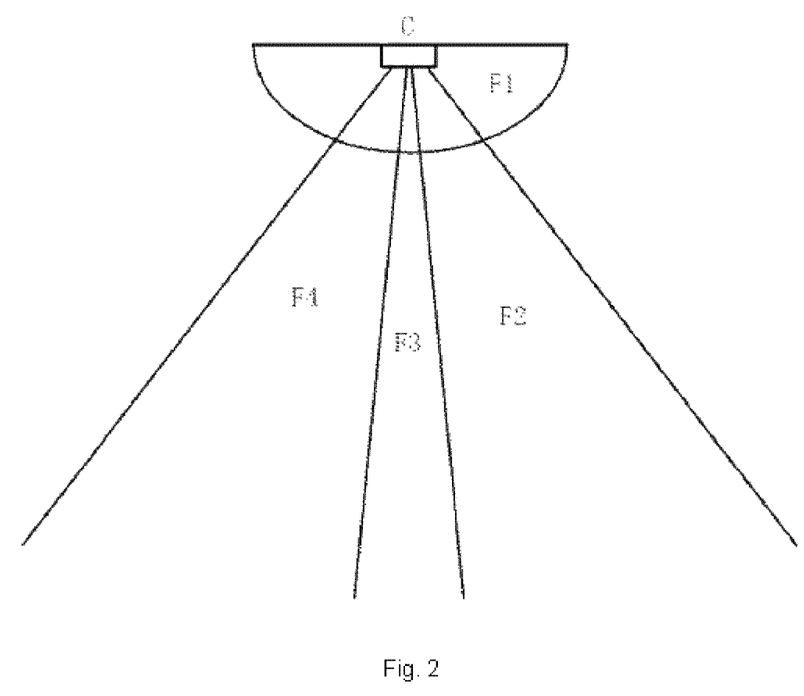
FIG. 2 is a schematic diagram of signal distribution of a charging base according to some embodiment of the disclosure.

A method for controlling a robot to return to a base is provided. The robot is a sweeping robot, a scrubbing robot, a security robot, or an accompanying robot. These robots can walk autonomously and automatically find charging bases to return to the bases for recharging. Return-to-base codes built in the robots are different, return-to-base modes are different, and return-to-base efficiencies are also different. As shown in FIG. 1, the method for controlling the robot to return to the base according to embodiments includes the following steps. In S1, the robot receives a return-to-base signal, in some embodiments, the return-to-base signal is a signal sent by a user through a remote control device such as a robot remote control or a smart phone to control the robot to return to a base, in some embodiments, the return-to-base signal is a signal generated by self-checking of an internal control system of the robot. For example, when detecting low battery, the robot needs to return for charging, and will automatically generate the return-to-base control signal. The robot enters a return-to-base mode according to the return-to-base control signal received, and starts to find the charging base. In S2, in the process of finding the charging base, the robot walks along different preset paths according to different receiving conditions of guidance signals. The guidance signals are signals sent by the charging base for piloting the robot to return to the base. According to numbers and installation positions of infrared emission sensors set in the charging base, the guidance signal can be divided into different signal types, for example, an intermediate signal sent by an infrared emission sensor located in the middle in front of the charging base, a left signal sent by an infrared emission sensor located on the left side in front of the charging base, and a right signal sent by an infrared emission sensor located on the right in front of the charging base, and the guard rail signal sent by infrared emission sensors on both sides of the charging base. While, the guidance signal can also be divided into a far-end signal, a central signal, a near-end signal, and so on according to distance of signal distribution areas. In addition, multiple infrared receiving sensors arranged on a body of the robot, which can receive the guidance signal sent by the infrared emission sensors of the charging base, are adopted, and are respectively arranged at different positions of the body. The infrared receiving sensors of the robot in the embodiment are respectively arranged in front, left front, right front, left rear, and right rear of the robot, so that the robot can receive the guidance signal in all directions and improve accuracy of the robot in judging its own position. Each of the infrared receiving sensors can be set with a code, and code value can be set freely, so that the robot can more accurately know which of the guidance signal is located in which direction of the robot, facilitating positioning of the robot. As shown in FIG. 2, in the embodiments, the guidance signal sent by a charging base C include an intermediate signal F3, a left signal F4, a right signal F2, and a guard rail signal F1. The guard rail signal F1 is a signal distributed in an area encircled by a front arc of the charging base C. Located in front of the charging base C, a signal distributed in an area defined by two downwardly extending diagonal lines is the intermediate signal F3. Located in front of the charging base C, a signal distributed in an area defined by two downwardly extending diagonal lines on far left is the left signal F4. Located in front of the charging base C, a signal distributed in an area defined by two downwardly extending diagonal lines on far right is the right signal F2. The preset paths are paths trajectories in set shapes, and these path trajectories are researched by research and development personnel through continuous analysis, testing, and improvement. The robot can quickly find the intermediate signal by walking on path trajectories in different shapes under different conditions. In S3, the robot returns to the base directly under piloting of an intermediate signal once detecting the intermediate signal during walking on the preset path. As for how the robot returns to the base under piloting of the intermediate signal, this is already a mature technology in the industry. Most robots having return-to-base functions return to their bases under the piloting of the intermediate signal, which will not be elaborated here. In the method according to the embodiments, the robot quickly finds out the intermediate signal sent by the charging base by walking along the different preset paths according to different receiving conditions of the guidance signals, so that the return-to-base efficiency of the robot is improved, and the problem of return-to-base failure or low return-to-base efficiency when the robot cannot find the intermediate signal is avoided.

Specifically, the robot walks along the different preset paths according to the different receiving conditions of the guidance signals specifically includes the following steps. First of all, the most important thing for the robot at this time is to find the guidance signals when the robot does not receive the guidance signals, the position of the charging base cannot be obtained if the guidance signals are not found, and thus the robot needs to walk along a first preset path. The first preset path pilots the robot to quickly find the guidance signals. Secondly, when the robot receives the left signal or the right signal, it indicates that the robot is located on the left or right side in front of the charging base; at this time, the most important thing for the robot is to find the intermediate signal as soon as possible, and thus the robot needs to walk along a second preset path, and the second preset path pilots the robot to quickly find the intermediate signal. Finally, when the robot receives the guard rail signal, it indicates that the robot is relatively close to the charging base at this time; however, being too close to the charging base is not conducive to the accurate return of the robot, which easily causes the robot to collide with the charging base to change the position of the charging base. Thus, the robot needs to walk along a third preset path. The third preset path pilots the robot to quickly exit an area where the guard rail signal locates, and quickly find the intermediate signal. It is to be noted that in the process that the robot walks along the first preset path, the second preset path and the third preset path, the robot walks along a corresponding path according to a type of a latest received signal until receiving the intermediate signal. For example, the robot currently walks along the first preset path while receiving the guard rail signal, then the robot walks along the third preset path, and when receiving the left signal while walking, the robot again walks along the second preset path, and so on, until receiving the intermediate signal, so that the robot will return to the base directly under piloting of the intermediate signal. In the embodiments, by dividing the guidance signals receiving conditions of the robot into three types, and correspondingly controlling the robot to walk along three different preset paths, the robot can be returned to the base in a more targeted and faster manner.

Figure 3:
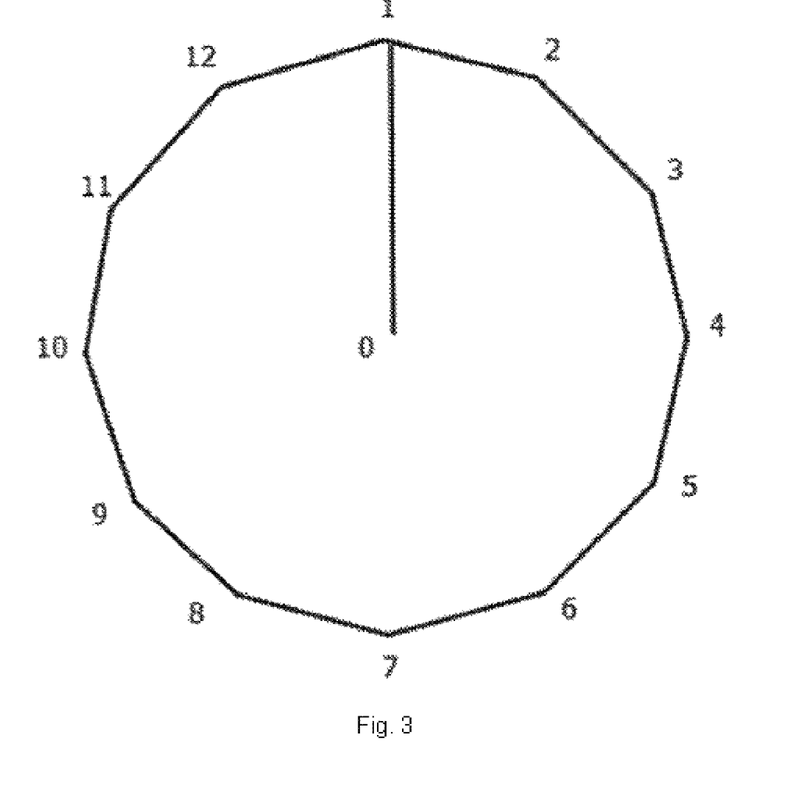
FIG. 3 is a schematic diagram of a path of the robot walking along a first preset path.

As some embodiments, the robot walks along the first preset path without receiving the guidance signals specifically includes the following steps. Firstly, the robot judges that the guidance signals are not detected according to a detection state of its infrared receiving sensors. Secondarily, as shown in FIG. 3, the robot takes a path, corresponding to a regular dodecagon that takes a current position as a center point 0 and a first preset distance as a radius 01, as the first preset path, i.e., the regular dodecagon denoted with 1 to 12 in the figure. The first preset distance is set to different values according to different product design requirements, preferably, the first preset distance is set to 2.5 meters in the embodiment, so that the guidance signals can be searched more comprehensively. The robot walks straight to a corner point 1 of the regular dodecagon from the corner point 0. Later, the robot walks in a clockwise direction to the next adjacent corner points 2, 3, 4, 5, 6, 7, 8, 9, 10, 11, and 12 sequentially along sides of the regular dodecagon until reaching the initial corner point 1. The robot can also walk in an anticlockwise direction along at least one side of the regular dodecagon, which is reverse to the sequence in FIG. 3. When walking along at least the one side, as long as detecting the guidance signals, the robot immediately stops walking on the current path, and selects different walking modes according to the type of the received guidance signals. For example, if detecting the left signal or the right signal, the robot starts to walk along the second preset path; if detecting the guard rail signal, the robot walks along the third preset path; if detecting the intermediate signal, the robot returns to the base under piloting of the intermediate signal. In the embodiment, the robot walks along the path trajectory of the regular dodecagon, can perform a comprehensive signal search in large range, so that the guidance signals sent by the charging base can be found out quickly.

Figure 6:
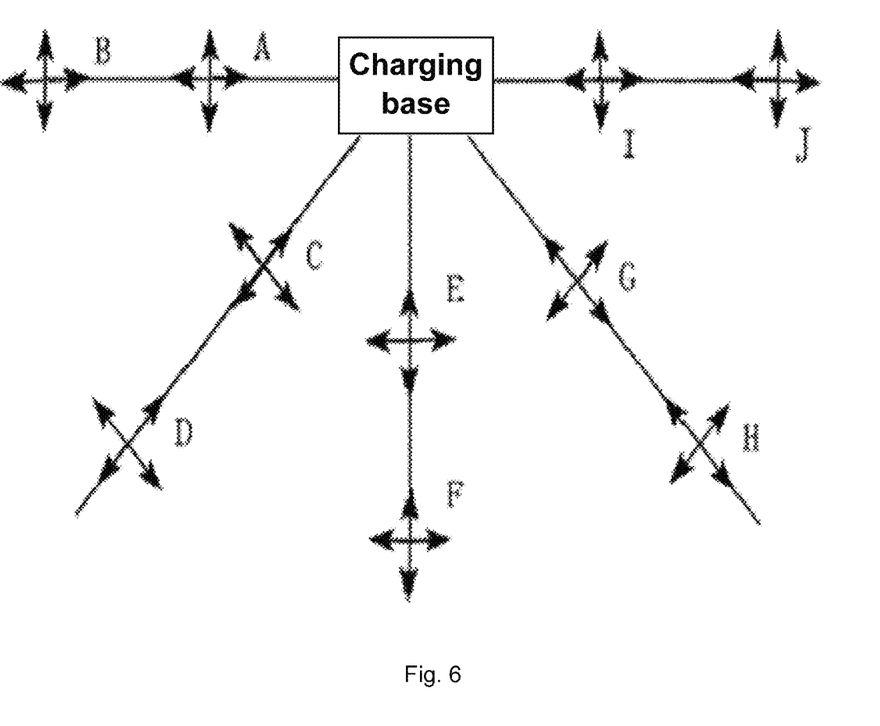
FIG. 6 is a schematic diagram of position distribution of national standards during a national standard test according to some embodiment of the disclosure.

As shown in FIG. 6, the robot generally does not receive the guidance signals when located at a position B or a position J in the national standard test, and if walking along the first preset path, the robot quickly moves to an area with a signal.

As a further embodiment, after the step that the robot walks in the clockwise direction or the counterclockwise direction to the next adjacent corner point along at least the one side of the regular dodecagon until reaching the initial corner point, the method further includes the following steps. Firstly, the robot judges whether the number of times of walking along the first preset path reaches a first preset number of times, in a case that the number of times of walking along the first preset path reaches the first preset number of times, it indicates that the robot has performed the signal search in a large range but the guidance signals are still not defected, which is probably because there is no charging base or the charging base has failures and the like, the robot does not need to keep searching, so that the robot stops walking along the first preset path, but stands by in place or prompts a user to handle it by voice; in a case that the number of times of walking along the first preset path does not reach the first preset number of times, it indicates that the search range of the robot is not large enough, which may because the position of the charging base is far away from the robot and the robot needs to continue searching, therefore, the robot takes a current position as a center point of the regular dodecagon, and continues to walk along the first preset path as shown in FIG. 3. The first preset number of times can be set correspondingly according to specific product design requirements. Preferably, the number is set to 2 times or 3 times in the embodiment. According to the embodiment, by controlling the robot to continue to perform a certain time of repeated search along the first preset path when the guidance signal is not detected, the robot is prevented from blindly searching for the charging base or easily giving up returning to the base, so that effectiveness and stability of the robot in returning to the base are improved.

As a further embodiment, the step that the robot walks in the clockwise direction or the counterclockwise direction to the next adjacent corner point along at least the one side of the regular dodecagon until reaching the initial corner point specifically includes the following steps. As shown in FIG. 3, when the robot walks along at least the one side of the regular dodecagon from a corner point 1 to a corner point 2, an obstacle is detected, because the corner point 2 is not the initial corner point 1, the robot no longer walks toward the corner point 2, but turns and walks to a corner point 3. Similarly, when the robot walks toward the corner point 3, if an obstacle is detected, the robot will turn and walk toward a corner point 4. If no obstacle is detected, the robot walks to the corner point 3 and then walks toward the corner point 4 along at least the one side of the regular dodecagon. And so on, after walking to a corner point 12, the robot will continue to walk toward the corner point 1 along at least the one side of the regular dodecagon. In the process of walking toward the corner point 1, if no obstacle is detected, the robot will complete a walk along the first preset path after walking to corner point 1. If an obstacle is detected, the robot judges that the corner point 1 is the initial corner point, and then no longer walks toward the corner point 2, but walks along an edge of the obstacle, particularly walks along the edge of the obstacle inside the regular dodecagon, or walks along the edge of the obstacle outside the regular dodecagon. The robot detects to judge whether it returns to a side 12-1 of the regular dodecagon while walking, if so, then the robot continues to walk towards the corner point 1 along at least the one side; if not, then continues to walk to reach the corner point 1. If the robot walks for a long distance along at least the one side, the distance can be set according to specific design requirements. For example, if the robot walks 1 meter and has not reached the corner point 1, it will stop walking and take a current position as a reached corner point 1, so as to complete a walk along the first preset path. According to the embodiment, in the process of walking along the first preset path, the robot can handle flexibly when detecting the obstacle, so that the efficiency of the robot to find the guidance signals along the first preset path can be improved, the situation that the robot blindly finds the corner points and falls into an infinite loop can be avoided, which improves the flexibility and intelligence of the robot.

Figure 4:
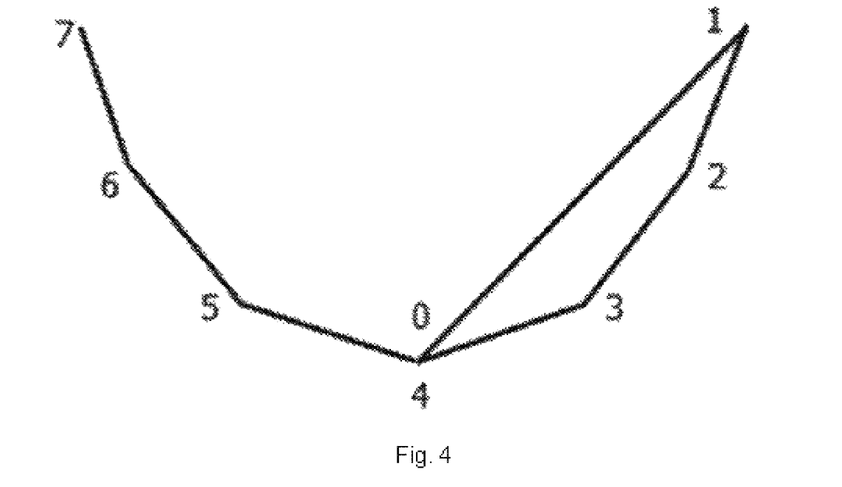
FIG. 4 is a schematic diagram of a path of the robot walking along a second preset path.

As one of embodiments, the step that the robot walks along the second preset path when receiving the left signal or the right signal specifically includes the following steps. Firstly, the left signal or the right signal are detected by the robot, which indicates that the robot is located on the left or the right in front of the charging base at this time, here, the robot needs to find the intermediate signal based on a current position. Therefore, as shown in FIG. 4, the robot takes a path, corresponding to a half regular dodecagon that takes a current position 0 as a center corner point 4 and a second preset distance as a radius, as the second preset path, i.e., the half regular dodecagon denoted with 1, 2, 3, 4, 5, 6, and 7 in the figure. The second preset distance is set to different values according to different requirements of product designs, preferably, is set to 1.5 meters in the embodiment, so that the intermediate signal is quickly found. The robot walks from the position point 0 to a corner point 1 corresponding to a tip of one end of the half regular dodecagon. Then, the robot walks along at least one side of the half regular dodecagon to a next adjacent corner point 2, then walks from the corner point 2 to a corner point 3, and so on, until the robot walks to a corner point 7 corresponding to a tip of an other end of the half regular dodecagon, so as to complete a walk on the second preset path. The robot also walks in an anticlockwise direction along at least the one side of the regular dodecagon, which is reverse to the sequence in FIG. 4. When walking along at least the one side, as long as detecting the intermediate signal, the robot immediately stops walking on the current path, and returns to the base directly under piloting of the intermediate signal according to the type of the received intermediate signal. In the embodiment, the robot walks along the path trajectory of the half regular dodecagon, and quickly finds out the intermediate signal sent by the charging base.

As shown in FIG. 6, the robot receives the left signal or the right signal when located at a position D or a position H in the national standard test, and if walking along the second preset path, the robot can quickly move to an area where the intermediate signal locates.

As a further embodiment, after the step that the robot walks to the next adjacent corner point along at least the one side of the half regular dodecagon until reaching the corner point corresponding to the tip of the other end of the half regular dodecagon, the method further includes the following steps. Firstly, the robot judges whether the number of times of walking along the second preset path reaches a second preset number of times, in case that the number of times of walking along the second preset path reaches the second preset number of times, it indicates that the robot has performed the signal search in a large range but the intermediate signal is still not defected, which is probably because the left signal or the right signal received by the robot is an interference signal which is no need to be searched for by the robot, so that the robot stops walking along the second preset path, but stands by in place or prompts a user to handle it by voice; in case that the number of times of walking along the second preset path does not reach the second preset number of times, it indicates that the search range of the robot is not large enough, which may because the coverage of the left signal or the right signal of the charging station is relatively large and the robot needs to continue searching, therefore, the robot takes a current position as a center point of the half regular dodecagon, and continues to walk along the first preset path as shown in FIG. 4. The second preset number of times is set correspondingly according to specific product design requirements. Preferably, the number is set to 2 times in the embodiment. According to the embodiment, by controlling the robot to continue to perform a certain time of repeated search along the second preset path when the left signal or the right signal is not detected, the robot is prevented from blindly searching for the intermediate signal or easily giving up returning to the base, so that effectiveness and stability of the robot in returning to the base are improved.

As a further embodiment, the step that the robot walks to the next adjacent corner point sequentially along at least the one side of the half regular dodecagon until reaching the corner point corresponding to the tip of the other end of the half regular dodecagon specially includes the following steps. As shown in FIG. 4, when the robot walks along at least the one side of the half regular dodecagon from a corner point 1 to a corner point 2, an obstacle is detected, because the corner point 2 is not the initial corner point 7 corresponding to the tip of the other end of the half regular dodecagon, the robot no longer walks toward the corner point 2, but turns and walks to a corner point 3. Similarly, when the robot walks toward the corner point 3, if an obstacle is detected, the robot will turn and walk toward a corner point 4. If no obstacle is detected, the robot walks to the corner point 3 and then walks toward the corner point 4 along at least the one side of the half regular dodecagon. And so on, after walking to a corner point 6, the robot will continue to walk toward the corner point 7 along at least the one side of the half regular dodecagon. In the process of walking toward the corner point 7, if no obstacle is detected, the robot will complete a walk along the second preset path after walking to the corner point 7. If an obstacle is detected, the robot judges that the corner point 7 is the corner point corresponding to the tip of the other end of the half regular dodecagon, and then starts to walk along an edge of the obstacle, particularly walks along the edge of the obstacle inside the half regular dodecagon, or walk along the edge of the obstacle outside the half regular dodecagon. The robot detects to judge whether it returns to a side 6-7 of the half regular dodecagon while walking, if so, then the robot continues to walk towards the corner point 7 along at least the one side. If not, the robot continues to walk to reach the corner point 7. If the robot walks for a long distance along at least the one side, the distance can be set according to specific design requirements. For example, if the robot walks 0.8 meter and has not reached the corner point 7, it will stop walking and take the current position as the reached corner point 7, so as to complete a walk along the second preset path. According to the embodiment, in the process of walking along the second preset path, the robot can handle flexibly when detecting the obstacle, so that the efficiency of the robot to find the intermediate signal along the second preset path can be improved, the situation that the robot blindly finds the corner points and falls into an infinite loop can be avoided, which improves the flexibility and the intelligence of the robot.

Figure 5:
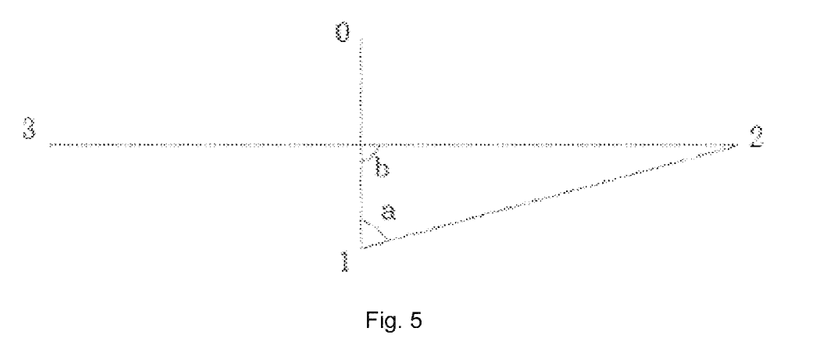
FIG. 5 is a schematic diagram of a path of the robot walking along a third preset path.

As some embodiments, the step that the robot walks along the third preset path when receiving the guard rail signal specifically includes the following steps. Firstly, the robot judges that the guard rail signal is detected according to a detection result of its infrared receiving sensor. Then, as shown in FIG. 5, the robot takes a current position as a starting point 0, and moves back along a first straight line 01 for a third preset distance. The third preset distance is set according to the distribution range of the guard rail signal, and preferably, is set to 50 cm in the embodiment. Then, the robot turns, and walks straight along a second straight line 12 for a fourth preset distance. The fourth preset distance is set according to the distribution range of the guard rail signal, and preferably, is set to 60 cm in the embodiment. Then, the robot turns, and walks straight along a third straight line 23 for a fifth preset distance. The fifth preset distance is set according to the distribution range of the guard rail signal, and preferably, is set to 110 cm in the embodiment. When walking to a position point 3, the robot completes a walk on the third preset path. An angle a between the first straight line 01 and the second straight line 12 is a first angle, which is preferably 75 degrees. An angle b between the first straight line 01 and the third straight line 23 is a second angle, which is preferably 90 degrees. During walking, as long as detecting the guidance signal of other types, the robot immediately stops walking on the current path, and selects a corresponding walking mode according to the type of the received guidance signal. For example, if detecting the left signal or the right signal, the robot starts to walk along the second preset path; if detecting the intermediate signal, the robot returns to the base under piloting of the intermediate signal. In the embodiment, the robot walks on a triangle-crossing path trajectory, and quickly exits a guard rail signal area, to avoid the problem that when being too close to the charging base, it is difficult to achieve precise angle alignment adjustment and unable to accurately return to the base, thereby ensuring accuracy and effectiveness of the subsequent return-to-base operation.

As a further embodiment, after the robot walks straight along the third straight line for the fifth preset distance, the method further includes the following steps. Firstly, the robot judges whether the number of times of walking along the third preset path reaches a third preset number of times, if so, it indicates that since a signal received by the robot may be an interference signal, or a sensor of the robot is faulty, or the like, it is difficult for the robot to continue to exit the guard rail signal area, and it will make a user think that the robot is running around, so that, the robot stops walking along the third preset path, and prompts the user to handle it with a voice; If it does not reach the third preset number of times, it indicates that the guard rail signal range of the charging base is wide, and the robot may exits the guard rail signal area if it continues to walk, so that the robot continues to walk along the third preset path with a current position as a starting point. The third preset number of times is set to 2 times or 3 times. In this way, it is possible to reasonably control the robot to execute a mode of exiting the guard rail signal area, thereby preventing the robot to execute the mode endlessly or blindly, and improving the flexibility and the intelligence of the robot.

As a further embodiment, as shown in FIG. 5, when the robot walks along the first straight line 01, if an obstacle is detected, the robot will walk along an edge of the obstacle; when walking along the edge of the obstacle and returning to the first straight line 01, the robot continues to walk along the first straight line until a linear distance reaches 50 cm (i.e., the third preset distance), then walks along the second straight line. When the robot walks along the edge of the obstacle for a sixth preset distance and does not return to the first straight line, the robot turns and starts to walk straight along the second straight line. The sixth preset distance is 60 cm, preferably. When the robot walks along the second straight line 12 in case that an obstacle is detected, the robot walks along an edge of the obstacle. When walking along the edge of the obstacle and returning to the second straight line 12, the robot continues to walk along the second straight line until a linear distance along the second straight line 12 reaches 60 cm (i.e., the fourth preset distance), and stops, then turns and starts to walk straight along the third straight line 23. When the robot walks along the edge of the obstacle for a seventh preset distance and does not return to the second straight line 12, the robot turns and starts to walk straight along the third straight line 23. The seventh preset distance is 70 cm, preferably. When the robot walks along the third straight line 23 in case that an obstacle is detected, the robot walks along an edge of the obstacle. When walking along the edge of the obstacle and returning to the third straight line 23, the robot continues to walk along the third straight line 23 until a linear distance along the third straight line reaches 110 cm, and stops, then turns and starts to walk straight along the third straight line 23. When the robot walks along the edge of the obstacle for an eighth preset distance and does not return to the third straight line 23, the robot stops, thereby completing walking on the third straight line. The eighth preset distance is 120 cm, preferably. According to the embodiment, in the process of walking along the third preset path, the robot can handle flexibly when detecting an obstacle, so that the efficiency of the robot to exit the guard rail signal area along the third preset path can be improved, while the efficiency of the robot to find other guidance signals can also be improved.

As mentioned in the above embodiments, the robot records and determines its current position and direction in real time by its own driving wheel coded disc, gyroscope, camera, laser radar and other sensors during walking, so as to realize autonomous and purposeful movement and navigation.

Those of ordinary skill in the art can understand that all or part of the steps in each of the foregoing method embodiments can be implemented by hardware related to a program instruction. When the program is executed, the steps including the foregoing method embodiments are performed. The last thing to be noted is: the above embodiments are only used to illustrate the technical solutions of the disclosure and not used to limit the same and the various embodiments can be combined with each other. Although the disclosure has been described in detail with reference to the foregoing embodiments, for those skilled in the art, they can still modify the technical solutions described in the foregoing embodiments, or equivalently replace part or all of the technical features; all these modifications and replacements shall not cause the essence of the corresponding technical solutions to depart from the scope of protection of the disclosure.

What is claimed is:

1. A method for controlling a robot to return to a base, comprising:
   receiving, by a robot, a return-to-base control signal;
   walking, by the robot, along different preset paths according to different receiving conditions of guidance signals; and
   directly returning, by the robot, to the base according to a intermediate signal when detecting the intermediate signal during walking along the preset path;
   wherein the guidance signals are signals sent by a charging base, for piloting the robot to return to the base, and comprise the intermediate signal;
   wherein walking, by the robot, along the different preset paths according to the different receiving conditions of the guidance signals specifically comprises: walking, by the robot, along a first preset path without receiving the guidance signals; walking, by the robot, along a second preset path when receiving a left signal or a right signal; and walking, by the robot, along a third preset path when receiving a guard rail signal; wherein, during walking along the different preset paths, the robot walks along the first preset path, the second preset path, or the third preset path according to the receiving conditions of the guidance signals, and the guidance signals further comprises the left signal, the right signal, and the guard rail signal, wherein, the preset paths comprises: the first preset path, the second preset path, and the third preset path, the receiving conditions comprises: the robot walks along the first preset path without receiving the guidance signals, the robot walks along the second preset path when receiving the left signal or the right signal, the robot walks along the third preset path when receiving the guard rail signal;
   wherein walking, by the robot, along the first preset path without receiving the guidance signals specifically comprises: detecting, by the robot, there is no the guidance signals, by taking a path, corresponding to a regular dodecagon that takes a current position as a starting point center point and as a radius, as the first preset path, walking a first preset distance straight, by the robot, to a corner point of the regular dodecagon; and walking, takes the corner point as a starting point by the robot, in a clockwise direction or a counter-clockwise direction to a next corner point along at least one side of the regular dodecagon sequentially until reaching the corner point, wherein the regular dodecagon takes the starting point as center point and the first preset distance as a radius:
   wherein walking, by the robot, along the second preset path when receiving the left signal or the right signal specifically comprises: detecting, by the robot, the left signal or the right signal; by taking a path, corresponding to a half regular dodecagon that takes a current position as a center corner point and a second preset distance as a radius, as the second preset path, walking straight, by the robot, to a corner point corresponding to a tip of one end of the half regular dodecagon, wherein the center corner point is a starting point of the robot; and walking, takes the center corner point as a starting point by the robot, along at least one side of the half regular dodecagon to a next corner point sequentially until reaching a corner point corresponding to a tip of an other end of the half regular dodecagon;
   wherein walking, by the robot, along the third preset path when receiving the guard rail signal specifically comprises: detecting, by the robot, the guard rail signal; moving back, by the robot, along a first straight line for a third preset distance by taking a current position as a starting point; turning, by the robot, and walking straight along a second straight line for a fourth preset distance; and turning, by the robot, and walking straight along a third straight line for a fifth preset distance, to complete walking on the third preset path, wherein an angle between the first straight line and the second straight line is a first angle, and an angle between the first straight line and the third straight line is a second angle.

2. The method according to claim 1, wherein after walking, by the robot, in the clockwise direction or the counter-clockwise direction to the next adjacent corner point along at least the one side of the regular dodecagon sequentially until reaching the initial corner point, the method further comprises:
   judging, by the robot, whether the number of times of walking along the first preset path reaches a first preset number of times, in a case that the number of times of walking along the first preset path reaches the first preset number of times, stopping walking along the first preset path, and in a case that the number of times of walking along the first preset path does not reach the first preset number of times, continuing to walk along the first preset path with a current position as a center point of the regular dodecagon.

3. The method according to claim 1, wherein walking, by the robot, in the clockwise direction or the counterclockwise direction to the next adjacent corner point along at least the one side of the regular dodecagon sequentially until reaching the initial corner point specifically comprises:
   walking, by the robot, along at least the one side of the regular dodecagon toward the next adjacent corner point; and
   when an obstacle is detected, judging, by the robot, whether the next adjacent corner point is the initial corner point, in case that the next adjacent corner point is the initial corner point, walking along an edge of the obstacle until reaching a side of the regular dodecagon, and then continuing to walk along at least the one side of the regular dodecagon, or until reaching the initial corner point, and in case that the next adjacent corner point is not the initial corner point, instead of walking toward the next adjacent corner point, turning, by the robot, and walking toward a corner point adjacent to the next adjacent corner point.

4. The method according to claim 1, wherein after walking, by the robot, along at least the one side of the half regular dodecagon to the next adjacent corner point sequentially until reaching the corner point corresponding to the tip of the other end of the half regular dodecagon, the method further comprises:
   judging, by the robot, whether the number of times of walking along the second preset path reaches a second preset number of times, in case that the number of times of walking along the second preset path reaches the second preset number of times, stopping walking along the second preset path, and in case that the number of times of walking along the second preset path does not reach the second preset number of times, continuing to walk along the second preset path with a current position as a center corner point of the half regular dodecagon.

5. The method according to claim 1, wherein walking, by the robot, along at least the one side of the half regular dodecagon to the next adjacent corner point sequentially until reaching the corner point corresponding to the tip of the other end of the half regular dodecagon specifically comprises:
   walking, by the robot, along at least the one side of the half regular dodecagon toward the next adjacent corner point; and
   when an obstacle is detected, judging, by the robot, whether the next adjacent corner point is the corner point corresponding to the tip of the other end of the half regular dodecagon, in case that the next adjacent corner point is the corner point corresponding to the tip of the other end of the half regular dodecagon, walking along an edge of the obstacle until reaching one side of the half regular dodecagon, and then continuing to walk along at least the one side of the half regular dodecagon, or until reaching the corner point corresponding to the tip of the other end of the half regular dodecagon, and in case that the next adjacent corner point is not the corner point corresponding to the tip of the other end of the half regular dodecagon, instead of walking toward the next adjacent corner point, turning, by the robot, and walking to a corner point adjacent to the next adjacent corner point.

6. The method according to claim 1, wherein after walking straight, by the robot, along the third straight line for the fifth preset distance, the method further comprises:
   judging, by the robot, whether the number of times of walking along the third preset path reaches a third preset number of times, in case that the number of times of walking along the third preset path reaches the third preset number of times, stopping walking along the third preset path, and in case that the number of times of walking along the third preset path does not reach the third preset number of times, continuing to walk along the third preset path with a current position as a starting point.

7. The method according to claim 1, wherein
   when the robot walks along the first straight line, in case that an obstacle is detected, the robot will walk along an edge of the obstacle: when walking along the edge of the obstacle and returning to the first straight line, the robot continues to walk along the first straight line until a linear distance along the first straight line reaches the third preset distance, and stops, then turns and starts to walk straight along the second straight line; when the robot walks along the edge of the obstacle for a sixth preset distance and does not return to the first straight line, the robot turns and starts to walk straight along the second straight line;
   when the robot walks along the second straight line, in case that an obstacle is detected, the robot will walk along an edge of the obstacle; when walking along the edge of the obstacle and returning to the second straight line, the robot continues to walk along the second straight line until a linear distance along the second straight line reaches the fourth preset distance, and stops, then turns and starts to walk straight along the third straight line; when the robot walks along the edge of the obstacle for a seventh preset distance and does not return to the second straight line, the robot turns and starts to walk straight along the third straight line; and
   when the robot walks along the third straight line, in case that an obstacle is detected, the robot will walk along an edge of the obstacle; when walking along the edge of the obstacle and returning to the third straight line, the robot continues to walk along the third straight line until a linear distance along the third straight line reaches the fifth preset distance, and stops, thereby completing walking along the third straight line: when the robot walks along the edge of the obstacle for an eighth preset distance and does not return to the third straight line, the robot stops, thereby completing walking on the third straight line.

8. The method according to claim 2, wherein walking, by the robot, in the clockwise direction or the counterclockwise direction to the next adjacent corner point along at least the one side of the regular dodecagon sequentially until reaching the initial corner point specifically comprises:
   walking, by the robot, along at least the one side of the regular dodecagon toward the next adjacent corner point; and
   when an obstacle is detected, judging, by the robot, whether the next adjacent corner point is the initial corner point, in case that the next adjacent corner point is the initial corner point, walking along an edge of the obstacle until reaching a side of the regular dodecagon, and then continuing to walk along at least the one side of the regular dodecagon, or until reaching the initial corner point, and in case that the next adjacent corner point is not the initial corner point, instead of walking toward the next adjacent corner point, turning, by the robot, and walking toward a corner point adjacent to the next adjacent corner point.

9. The method according to claim 4, wherein walking, by the robot, along at least the one side of the half regular dodecagon to the next adjacent corner point sequentially until reaching the corner point corresponding to the tip of the other end of the half regular dodecagon specifically comprises:

walking, by the robot, along at least the one side of the half regular dodecagon toward the next adjacent corner point; and when an obstacle is detected, judging, by the robot, whether the next adjacent corner point is the corner point corresponding to the tip of the other end of the half regular dodecagon, in case that the next adjacent corner point is the corner point corresponding to the tip of the other end of the half regular dodecagon, walking along an edge of the obstacle until reaching one side of the half regular dodecagon, and then continuing to walk along at least the one side of the half regular dodecagon, or until reaching the corner point corresponding to the tip of the other end of the half regular dodecagon, and in case that the next adjacent corner point is not the corner point corresponding to the tip of the other end of the half regular dodecagon, instead of walking toward the next adjacent corner point, turning, by the robot, and walking to a corner point adjacent to the next adjacent corner point.

10. The method according to claim 6, wherein when the robot walks along the first straight line, in case that an obstacle is detected, the robot will walk along an edge of the obstacle: when walking along the edge of the obstacle and returning to the first straight line, the robot continues to walk along the first straight line until a linear distance along the first straight line reaches the third preset distance, and stops, then turns and starts to walk straight along the second straight line; when the robot walks along the edge of the obstacle for a sixth preset distance and does not return to the first straight line, the robot turns and starts to walk straight along the second straight line;

when the robot walks along the second straight line, in case that an obstacle is detected, the robot will walk along an edge of the obstacle; when walking along the edge of the obstacle and returning to the second straight line, the robot continues to walk along the second straight line until a linear distance along the second straight line reaches the fourth preset distance, and stops, then turns and starts to walk straight along the third straight line; when the robot walks along the edge of the obstacle for a seventh preset distance and does not return to the second straight line, the robot turns and starts to walk straight along the third straight line; and when the robot walks along the third straight line, in case that an obstacle is detected, the robot will walk along an edge of the obstacle; when walking along the edge of the obstacle and returning to the third straight line, the robot continues to walk along the third straight line until a linear distance along the third straight line reaches the fifth preset distance, and stops, thereby completing walking along the third straight line; when the robot walks along the edge of the obstacle for an eighth preset distance and does not return to the third straight line, the robot stops, thereby completing walking on the third straight line.

* * * * *